(12) United States Patent
Hu et al.

(10) Patent No.: US 7,952,896 B2
(45) Date of Patent: May 31, 2011

(54) POWER CONVERSION ARCHITECTURE WITH ZERO COMMON MODE VOLTAGE

(75) Inventors: Jun Hu, Rockford, IL (US); Vietson M. Nguyen, Rockford, IL (US); Waleed M. Said, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 434 days.

(21) Appl. No.: 12/229,124

(22) Filed: Aug. 20, 2008

(65) Prior Publication Data

US 2010/0045108 A1 Feb. 25, 2010

(51) Int. Cl.
H02M 5/452 (2006.01)
H02M 1/12 (2006.01)
(52) U.S. Cl. ............................. 363/37; 363/39
(58) Field of Classification Search ............. 363/34, 363/35, 37, 39, 98, 132
See application file for complete search history.

(56) References Cited

U.S. PATENT DOCUMENTS

| | | | |
|---|---|---|---|
| 5,673,189 A * | 9/1997 | Schettler | 363/137 |
| 5,684,688 A * | 11/1997 | Rouaud et al. | 363/132 |
| 5,936,856 A | 8/1999 | Xiang | |
| 6,031,738 A | 2/2000 | Lipo et al. | |
| 6,392,907 B1 * | 5/2002 | Ichikawa | 363/98 |
| 6,490,185 B1 * | 12/2002 | Yamanaka et al. | 363/98 |
| 7,215,559 B2 | 5/2007 | Nondahl et al. | |
| 2006/0067092 A1 | 3/2006 | Nondahl et al. | |

FOREIGN PATENT DOCUMENTS

| | | |
|---|---|---|
| EP | 1713168 A2 | 10/2006 |
| EP | 1855375 A1 | 11/2007 |
| WO | 2007129755 A1 | 11/2007 |

OTHER PUBLICATIONS

Wilkinson, "'Low-surge' inverters", http://machinedesign.com/ContentItem/61565/Lowsurgeinverters.aspx, retrieved May 9, 2008, Waukegen, USA.
Jokinen et al., "Fundamental Study of 2-level and 3-level Frequency Converters", Assignment on Converter Losses, Multilevel Converter Topologies, 2005, pp. 1-5, Smola, Norway.
Sakasegawa et al., "Compensation for Neutral Point Potential in Three-Level Inverter by using Motor Currents", Department of Electrical and Electronics Engineering, pp. 1-6, Kagoshima, Japan.
Schibli et al., "A Three-Phase Multilevel Converter for High-Power Induction Motors", IEEE Transactions on Power Electronics, Sep. 1998, pp. 978-986, vol. 13, No. 5.

(Continued)

Primary Examiner — Gary L Laxton
(74) Attorney, Agent, or Firm — Kinney & Lange, P.A.

(57) ABSTRACT

A controller for a power conversion system reduces common-mode voltage generated by the power conversion system by imposing a constraint on the control signals applied to the power conversion system. The power conversion system includes a plurality of switching devices that are responsive to control signals provided by the controller to selectively connect each output of the power conversion system to one of a plurality of inputs. The controller generates control signals based on a desired output of the power conversion system. In addition, the controller imposes a constraint on the control signals to reduce the common-mode voltage. The constraint is defined by assigning an integer value to each input of the power conversion system, and requiring that the selective connection of outputs to inputs must result in a sum of integer values equal to zero.

16 Claims, 3 Drawing Sheets

OTHER PUBLICATIONS

Purkait et al., "A New Generalized Space Vector Modulation Algorithm for Neutral-point-clamped Multilevel Converters", Progress in Electromagnetics Research Symposium 2006, Mar. 26-29, 2006, pp. 330-335, Cambridge, USA.

Fukada et al., Optimal-Regulator-Based Control of NPC Boost Rectifiers for Unity Power Factor and Reduced Neutral-Point-Potential Variations, IEEE Transactions on Industrial Electronics, Jun. 1999, pp. 527-534, vol. 46, No. 3.

Bendre et al., "Modeling and design of a 1,6 neutral point regulator for a three level diode clamped rectifier," Oct. 12, 2003.

Bendre et al., "Comparative evaluation of modulation algorithms for neutral point clamped converters," Oct. 3, 2004.

Official Search Report and Written Opinion of the European Patent Office in counterpart foreign Application No. 09252028.7, filed Aug. 20, 2009.

* cited by examiner

US 7,952,896 B2

POWER CONVERSION ARCHITECTURE WITH ZERO COMMON MODE VOLTAGE

BACKGROUND

The present invention relates generally to power conversion systems and in particular to systems and method for reducing the common mode voltage of power conversion systems.

In various applications, such as in aircraft and aerospace, power from an electric generator needs to be converted from one form to another before it is consumed by various types of loads. For example, electric generators typically generate alternating current (AC) power that must be converted to direct current (DC) power. The DC power is then converted back into AC power at a desired frequency and amplitude. A variety of power conversion devices (e.g., rectifier, auto-transformer, etc.) may be used to convert AC power to DC power. Likewise, a variety of power conversion devices (e.g., inverter) may be used to convert DC power to AC power.

A common problem with all types of power conversion systems is the generation of common-mode voltages in the output of the AC-to-DC and DC-to-AC converters. In some cases, the common-mode voltage is sufficient to cause large ground currents that can damage or otherwise shorten the life of the system (e.g., large ground currents generated as a result of common-mode voltages can damage bearings within a load). Common-mode voltages are also a source of electromagnetic interference that can reduce the reliability of a power conversion system and other electronic equipment. A system that reduces or eliminates the presence of common-mode voltages would therefore be advantageous.

SUMMARY

The present invention is directed towards a controller for reducing common-mode voltage in a power conversion system. The controller includes a plurality of control signal outputs connected to switching devices within the power conversion system, wherein the switching devices are responsive to the control signals to selectively connect each output of the power conversion system to one of a plurality of inputs to the power conversion system. The controller includes a reference signal processor, a comparator circuit, and a gating signal distributor. The reference signal processor modifies the input reference signals representing the desired values for the output of the power conversion system. The comparator circuit converts the modified reference signals to square wave representations of the reference signals, and the gating signal distributor is configured to generate the control signals to be supplied to the power conversion system based on the square wave representation of the reference signal. The gating signal distributor is also configured to impose a constraint on the control signals that is defined by assigning an integer value to each input of the power conversion system and requiring that selective connection of the outputs of the power conversion system to the inputs results in a sum of the integer values being equal to zero at any given time.

DETAILED DESCRIPTION

The present invention describes a power conversion system that minimizes common-mode voltage. In particular, the present invention provides a computationally simple method of controlling common-mode voltage that may be implemented in cost-effective analog circuitry or as an integrated circuit (IC).

Figure 1:
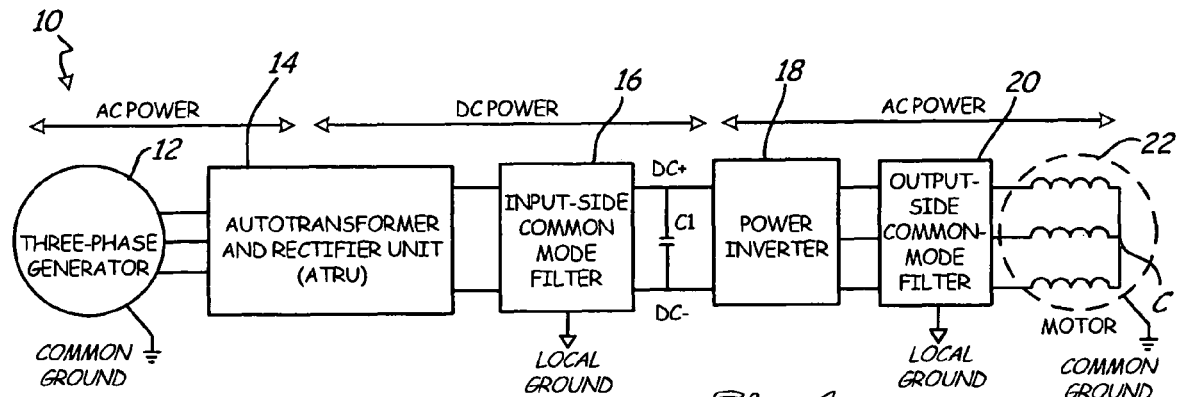
FIG. 1 is a block diagram of a power conversion system for reducing common-mode voltages as known in the prior art.

FIG. 1 is a block diagram of power conversion system 10 for reducing common-mode voltages as known in the prior art. Power conversion system 10 includes three-phase generator 12, auto-transformer and rectifier unit (ATRU) 14, input-side common-mode filter 16, power inverter 18, output-side common-mode filter 20, and motor 22.

Alternating current (AC) power generated by three-phase generator 12 is provided to ATRU 14, which converts the AC power to direct-current (DC) power. Common-mode voltages generated as a result of the AC-to-DC conversion are filtered by common-mode filter 16. In addition, the output of common-mode filter 16 (commonly referred to as the DC link, as indicated by the labels DC+ and DC−) is connected through capacitor C1 to provide additional energy storage and ripple smoothing. The combination of common-mode filter 16 and capacitor C1 reduces or removes the presence of common-mode voltages, but at the expense of additional size and weight of power conversion system 10.

In addition, power inverter 18 converts DC power to AC power for consumption by a load (in this case, motor 22). Once again, the AC power generated by power inverter 18 is subject to contain common-mode voltages. If unchecked, the common-mode voltage generated by power inverter 18 can cause a significant buildup of voltage at common-mode voltage point 'c' within motor 22. The buildup of voltage can lead to large currents being generated between motor 22 and ground, resulting in damage to motor bearings. Common-mode filter 20 located on the output of power inverter 18 is provided to remove the common-mode voltage. Once again, the addition of common-mode filter 20 increases the size, weight, and overall cost of power conversion system 10.

Figure 2:
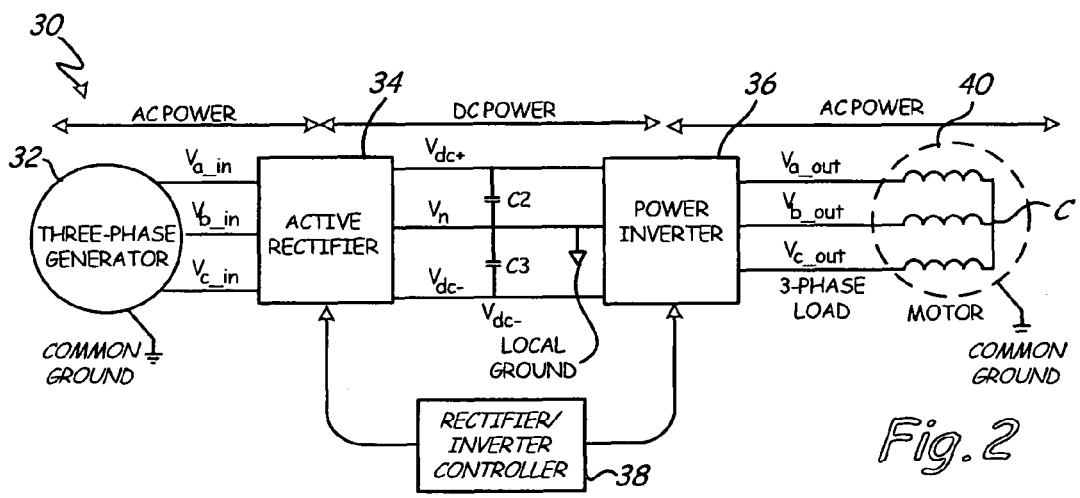
FIG. 2 is a block diagram of a power conversion system according to the present invention for reducing common-mode voltages.

FIG. 2 is a block diagram of a power conversion system 30 according to an embodiment of the present invention for reducing common-mode voltages. Power conversion system 30 receives AC power from AC power source 32 (e.g., three-phase generator or other suitable source of AC power) and converts the AC power first to DC power and then to AC power to be supplied to a load (e.g., motor 40). Power conversion system 30 includes active rectifier 34, power inverter 36, and rectifier/inverter controller 38.

In this embodiment, AC power source 32 provides three-phase power, although in other embodiments the AC inputs may be of any number of desired phases. Active rectifier 34 converts the AC power to DC power. Unlike traditional ATRU's employed by the prior art, active rectifier 34 includes a plurality of active switching components (e.g., transistors, bi-directional switches, etc.) that are responsive to control signals provided by rectifier/inverter controller 38. In this way, each DC output of active rectifier 34 can be selectively connected to each of the plurality of AC inputs provided to the active rectifier. In addition, in contrast with the traditional two-level output (e.g., positive DC bus and negative DC bus) generated by the ATRU of the prior art, active rectifier 34 includes an odd-number of outputs that includes in the exemplary embodiment shown in FIG. 3 a positive DC bus (labeled $V_{dc+}$), a negative DC bus (labeled $V_{dc-}$) and a neutral bus (labeled '$V_n$'). The DC outputs are referred to generally as the DC link. In other embodiments, additional outputs may be generated so long as the total number of DC outputs is odd. Included within the DC link are two capacitors, C2 and C3. Capacitor C2 is located between the positive DC bus and the neutral bus, and capacitor C3 is located between the neutral bus and the negative DC bus.

DC power generated by active rectifier 34 is provided as an input to power inverter 36, which converts the DC power to AC power of a desired frequency and magnitude for consumption by a load (e.g., motor 40). Power inverter 36 includes a plurality of active switching components (e.g., transistors, bi-directional switches, etc.) that are responsive to control signals provided by controller 38. In this way, each AC output of power inverter 36 can be selectively connected to each of the plurality of DC inputs. In the embodiment shown in FIG. 2, the AC output power generated by power inverter 36 is three-phase AC power (labeled $V_{a\_out}$, $V_{b\_out}$, and $V_{c\_out}$), although in other embodiments any number of desired AC output phases may be generated.

Rectifier/inverter controller 38 generates control signals that are provided to active components within active rectifier 34 and power inverter 36, respectively. For instance, with respect to active rectifier 34, controller 38 controls the DC output voltage $V_{dc+}$ of active rectifier 34 by selectively connecting the positive DC output $V_{dc+}$ to one of the AC input voltages $V_{a\_in}$, $V_{b\_in}$, and $V_{c\_in}$. Similarly, controller 38 controls the neutral DC output $V_n$ and the negative DC output $V_{dc-}$ by selectively connecting each output to one of the AC input voltages. Control signals generated by controller 38 are also used to control the AC output voltages $V_{a\_out}$, $V_{b\_out}$, and $V_{c\_out}$ generated by power inverter 36. Once again, controller 38 selectively connects each AC output voltage to either the positive DC bus $V_{dc+}$, the negative DC bus $V_{dc-}$, or the neutral bus $V_n$ as required in order to generate the desired AC output waveforms.

Proper selection of the control signals allows rectifier/inverter controller 38 to reduce or eliminate common-mode voltages generated by active rectifier 34 and power inverter 36, respectively. In this way, common-mode voltages that otherwise accumulate on the neutral DC bus $V_n$ or at node 'c' within motor 40 are prevented. In particular, controller 38 enforces a constraint on the connection between inputs and outputs made within active rectifier 34 and power inverter 36.

The constraint can be defined based on the possible states associated with each input/output of active rectifier 34 and power inverter 36. The possible states are best understood with respect to power inverter 36. Each of the DC inputs to power inverter 36 is assigned an integer value. For example, in the embodiment shown in FIG. 2, the positive DC input $V_{dc+}$ to power inverter 36 is assigned an integer value of '1', the negative DC input $V_{dc-}$ is assigned an integer value of '−1', and the neutral DC input $V_n$ is assigned an integer value of '0'. Based on the DC input connected to each AC output, the integer value associated with the DC input is assigned to the AC output to which it is connected. In the embodiment shown in FIG. 2, the following equations define the integer values to be assigned to the AC output based on the connection to the DC inputs.

$$Va\_out = \begin{cases} 1, & \text{connect\_to\_positive\_bus} \\ 0, & \text{connect\_to\_neutral\_bus} \\ -1, & \text{connect\_to\_negative\_bus} \end{cases} \quad (1)$$

$$Vb\_out = \begin{cases} 1, & \text{connect\_to\_positive\_bus} \\ 0, & \text{connect\_to\_neutral\_bus} \\ -1, & \text{connect\_to\_negative\_bus} \end{cases} \quad (2)$$

$$Vc\_out = \begin{cases} 1, & \text{connect\_to\_positive\_bus} \\ 0, & \text{connect\_to\_neutral\_bus} \\ -1, & \text{connect\_to\_negative\_bus} \end{cases} \quad (3)$$

To control the common-mode voltage, controller 38 enforces the following constraint on the connection between AC outputs to the DC inputs based on the integer values defined by equations (1)-(3).

$$Va\_out + Vb\_out + Vc\_out = 0 \quad (4)$$

This constraint reduces or eliminates the common-mode voltage that can accumulate at the output of power inverter 36 (e.g., at node 'c'). This constraint is embodied in the control signals generated by controller 38. For example, if output voltage $V_{a\_out}$ is connected to the positive DC bus ($V_{a\_out}=1$), then one of the remaining AC outputs (e.g., $V_{b\_out}$) is connected to the neutral bus ($V_{b\_out}=0$) and other remaining AC output (e.g., $V_{c\_out}$) is connected to the negative DC bus ($V_{c\_out}=-1$). In this example, the constraint is met because the sum of $V_{a\_out}$, $V_{b\_out}$, and $V_{c\_out}$ is equal to zero.

To reduce the common-mode voltage associated with active rectifier 34, a similar constraint would be imposed on the connection between the DC outputs (positive DC bus $V_{dc+}$, negative DC bus $V_{dc-}$, and neutral DC bus $V_n$) and the AC inputs $V_{a\_in}$, $V_{b\_in}$, and $V_{c\_in}$. With respect to active rectifier 34, each DC output is assigned an integer value. For example, in the embodiment shown in FIG. 2, positive DC bus $V_{dc+}$ is assigned an integer value of '1', neutral DC bus $V_n$ is assigned an integer value of '0', and negative DC bus $V_{dc-}$ is assigned an integer value of '−1'. Based on the AC input connected to each DC output, the integer value associated with each DC output is assigned to the AC input to which it is connected. In the embodiment shown in FIG. 2, the following equations define the integer values to be assigned to each AC input based on the connection to the DC outputs.

$$Va\_in = \begin{cases} 1, & \text{connect\_to\_positive\_bus} \\ 0, & \text{connect\_to\_neutral\_bus} \\ -1, & \text{connect\_to\_negative\_bus} \end{cases} \quad (5)$$

$$Vb\_in = \begin{cases} 1, & \text{connect\_to\_positive\_bus} \\ 0, & \text{connect\_to\_neutral\_bus} \\ -1, & \text{connect\_to\_negative\_bus} \end{cases} \quad (6)$$

$$Vc\_in = \begin{cases} 1, & \text{connect\_to\_positive\_bus} \\ 0, & \text{connect\_to\_neutral\_bus} \\ -1, & \text{connect\_to\_negative\_bus} \end{cases} \quad (7)$$

To control the common-mode voltage generated by active rectifier 34, controller 38 enforces the following constraint on the connection between DC outputs to the AC inputs based on the integer values defined by equation (5)-(7).

$$V_{a\_in} + V_{b\_in} + V_{c\_in} = 0 \quad (8)$$

This constraint reduces or eliminates the common-mode voltage that accumulates at the output of active rectifier 34 (e.g., on the neutral bus). This constraint is once again embodied in the control signals provided by controller 38. For example, if AC input $V_{a\_in}$ is connected to the positive DC bus ($V_{a\_in}=1$), then one of the remaining AC inputs (e.g., $V_{b\_in}$) is connected to the neutral DC bus ($V_{b\_in}=0$) and other remaining AC input (e.g., $V_{c\_in}$) is connected to the negative DC bus ($V_{c\_in}=-1$). In this example, the constraint is met because the sum of $V_{a\_in}$, $V_{b\_in}$ and $V_{c\_in}$ is equal to zero.

As a result of the constraints (defined by equations 1-8) imposed by controller 38, power generator system 30 of the present invention does not require the presence of common-mode voltage filters. Although capacitors C2 and C3 are included within the DC bus, these capacitors may be substantially smaller than capacitor C1 employed in the prior art power conversion system. Generation of the control signals is described in more detail with respect to FIGS. 4-6.

Figure 3:
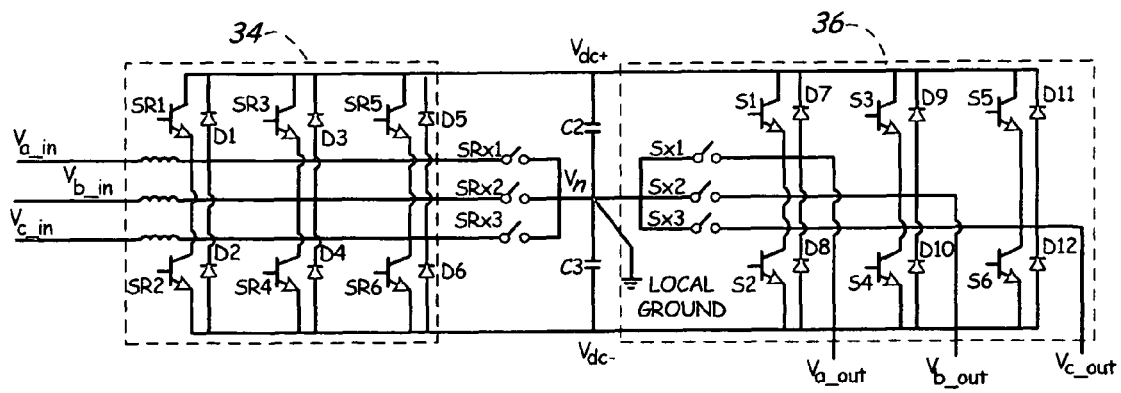
FIG. 3 is a circuit diagram of the active rectifier and power inverter employed by the power conversion system of the present invention.

FIG. 3 is a circuit diagram illustrating additional details regarding the active switch components included within active rectifier 34 and power inverter 36. Active rectifier 34 includes six transistors SR1, SR2, SR3, SR4, SR5, and SR6, six diodes D1, D2, D3, D4, D5 D6, inductors L1, L2 and L3, as well as three auxiliary switches SRx1, SRx2, and SRx3. Power inverter 36 includes six transistors S1, S2, S3, S4, S5, and S6, six diodes D7, D8, D9, D10, D11 and D12, as well as three auxiliary switches Sx1, Sx2 and Sx3.

Transistors SR1-SR6 and diodes D1-D6 are connected in a traditional two-level format, in which each AC input $V_{a\_in}$, $V_{b\_in}$, and $V_{c\_in}$ is connected to a pair of transistors and diodes. For instance, AC input $V_{a\_in}$ is connected to the positive DC bus through transistor SR1 and diode D1, and the negative DC bus through transistor SR2 and diode D2. AC input $V_{b\_in}$ is connected to the positive DC bus through transistor SR3 and diode D3, and the negative DC bus through transistor SR4 and D4. AC input $V_{c\_in}$ is connected to the positive DC bus through transistor SR5 and diode D5, and the negative DC bus through transistor SR6 and diode D6.

In addition, active rectifier 34 also includes three auxiliary switches SRx1, SRx2, and SRx3 that connect each phase of the AC input power 'a', 'b', and 'c', respectively, to the neutral DC bus. Auxiliary switches SRx1, SRx2 and SRx3 may include a single bi-directional semiconductor device or a plurality of bipolar switches and diodes.

Transistors SR1-SR6 and auxiliary switches SRx1-SRx3 are responsive to control signals generated by controller 38, allowing controller 38 to selectively control the connection of DC outputs to the AC inputs. In this way, controller 38 maintains the voltage of the DC outputs at desired values. In addition, controller 38 enforces the constraint defined by equations (5)-(8) to generate control signals that reduce or eliminate the generation of common-mode voltages.

Power inverter 36 also includes six transistors S1-S6 connected in a traditional power inverter topology in which each AC output phase is connected to the DC outputs through two transistors and two diodes. For instance, AC output $V_{a\_out}$ is connected to the positive DC output $V_{dc+}$ through transistor S1 and diode D7 and to the negative DC output $V_{dc-}$ through transistor S2 and diode D8. Likewise, AC output $V_{b\_out}$ is connected to the positive DC output $V_{dc+}$ through transistor S3 and diode D9 and to the negative DC output $V_{dc-}$ through transistor S4 and diode D10.

In addition, power inverter 36 includes three auxiliary switches Sx1, Sx2, and Sx3 connecting each AC output $V_{a\_out}$, $V_{b\_out}$, and $V_{c\_out}$, respectively, to the neutral DC bus $V_n$. As described with respect to active rectifier 34, auxiliary switches Sx1, Sx2 and Sx3 may include a single bi-directional semiconductor device or a plurality of bipolar switches and diodes.

Transistors S1-S6 and auxiliary switches Sx1-Sx3 are responsive to control signals generated by controller 38, allowing controller 38 to selectively control the connection of AC outputs to the DC inputs. In this way, controller 38 maintains the frequency, magnitude and phase of the AC outputs at desired values. In addition, controller 38 enforces the constraint defined by equations (1)-(4) to generate control signals that reduce or eliminate the generation of common-mode voltages.

The topology illustrated in FIG. 3 may be replaced with other well-known power conversion topologies. For instance, many power conversion topologies (including both active rectifier and power inverter topologies) make use of neutral-point clamping in which the auxiliary switches (e.g., Sx1, Sx2, Sx3) are replaced with one or more diode elements. A benefit of the topology illustrated with respect to FIG. 3 is the reduced losses associated with the addition of diode elements in neutral-point clamping implementations.

Figure 4:
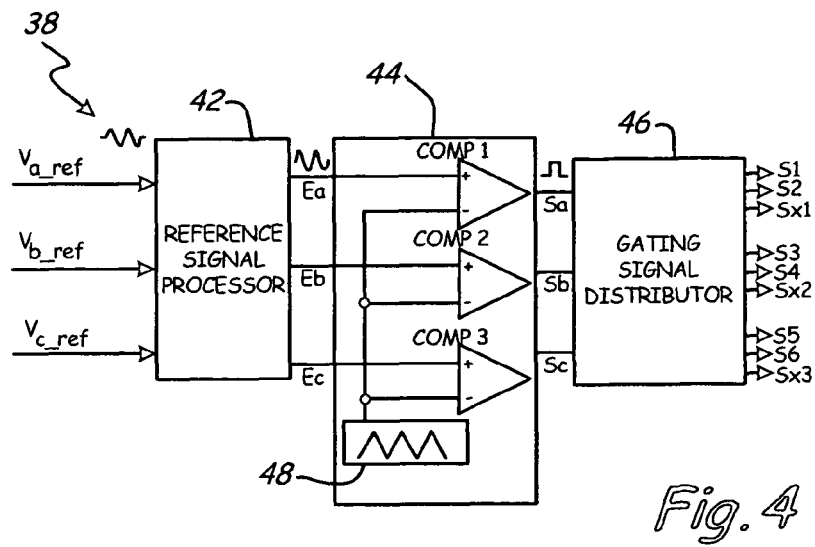
FIG. 4 is a block diagram of a controller employed by the power conversion system of the present invention to generate switching signals provided to the active rectifier and/or the power inverter.

FIG. 4 is a block diagram of components employed by an exemplary embodiment of controller 38 in generating control signals provided to the switches (e.g., transistors) located within active rectifier 34 and power inverter 36. In this embodiment, controller 38 includes reference signal processor 42, comparator circuit 44, and gating signal distributor 46. In addition, comparator circuit 44 includes comparators Comp1, Comp2, and Comp3 and triangle carrier generator 48.

Figure 5:
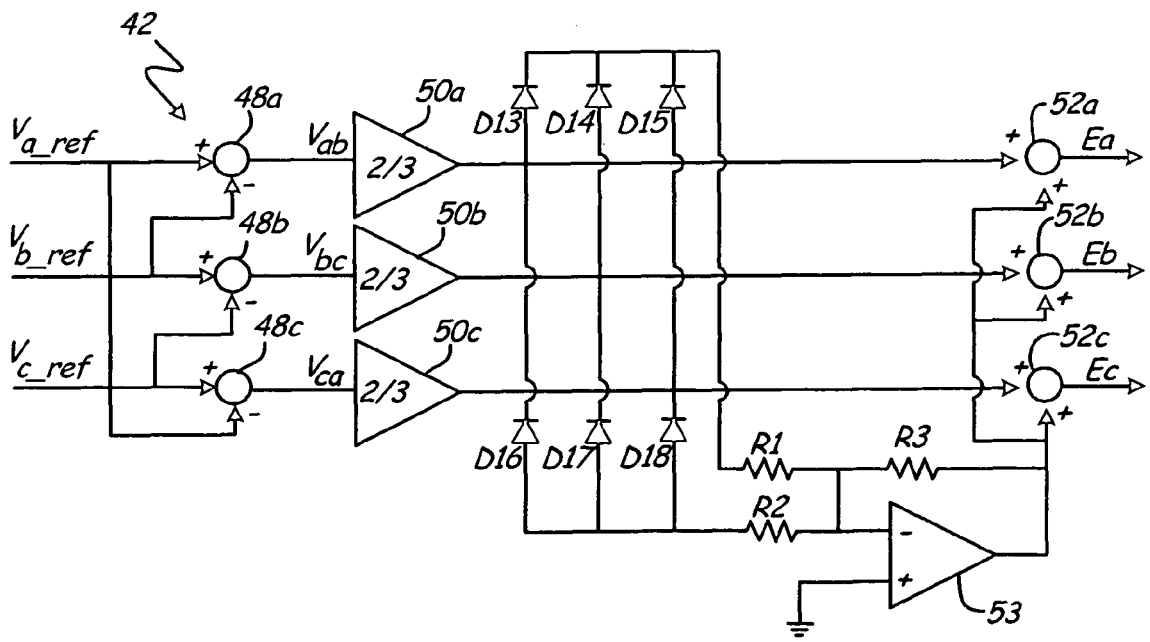
FIG. 5 is a logic diagram illustrating operations performed by the reference signal processor according to an aspect of the present invention.
Figure 6:
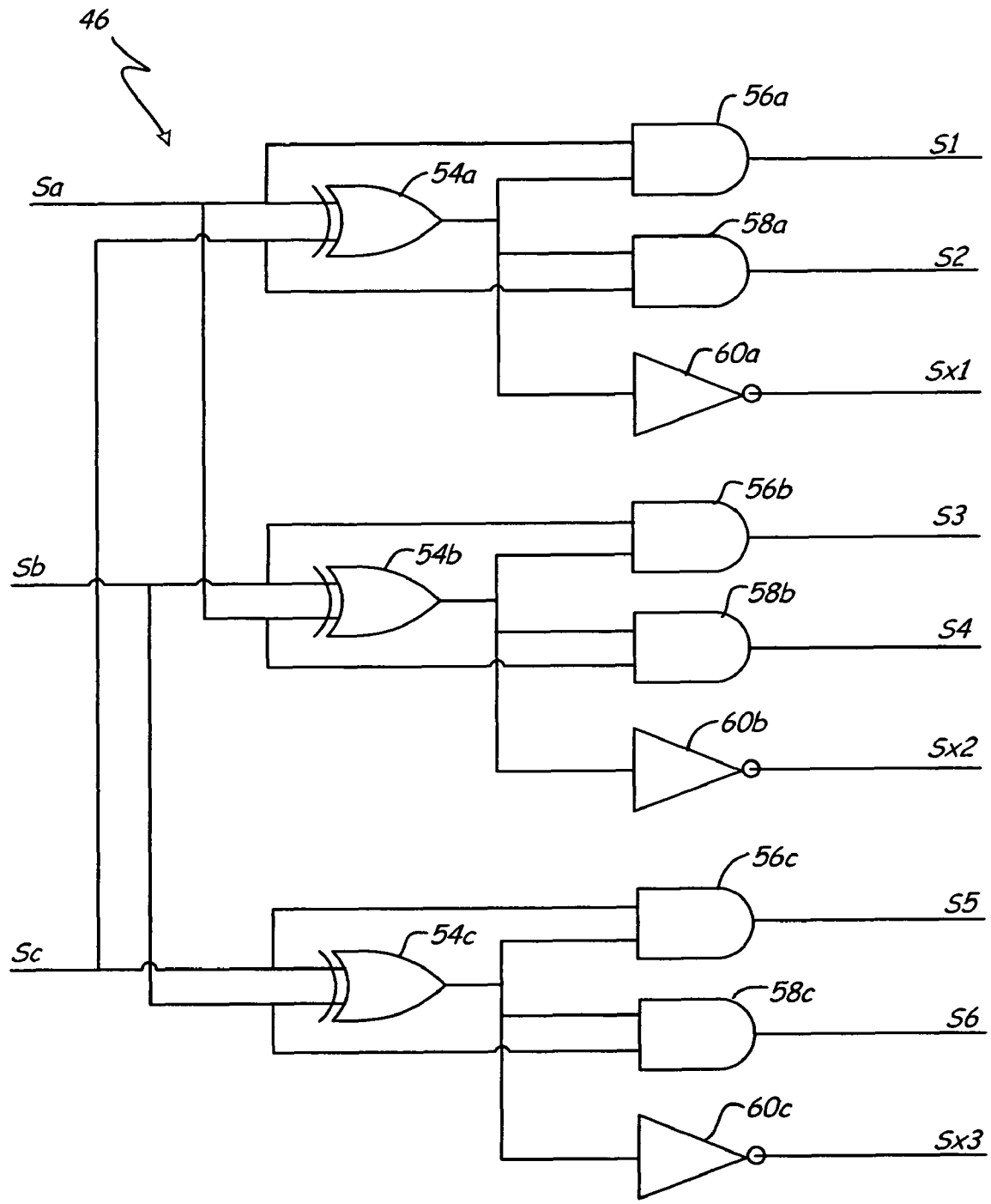
FIG. 6 is a logic diagram illustrating operations performed by the gating signal distributor according to an aspect of the present invention.

Controller 38 provides a method of reducing or eliminating common-mode voltage without requiring computationally complex algorithms or hardware requirements. In particular, components included within controller 38 may be implemented in analog circuitry or by an integrated circuit. In this way, the present invention does not require a digital signal processor (DSP) or other costly processing means. Controller 38 illustrated in FIGS. 4-6 illustrates generation of control signals for power inverter 36. The process for generating the control signals for active rectifier 34 would be substantially the same, except the reference signals would be used to regulate the desired DC output voltage.

Reference signals $V_{a\_ref}$, $V_{b\_ref}$, and $V_{c\_ref}$ represent the desired AC output voltage to be generated by power inverter 36. Reference signals $V_{a\_ref}$, $V_{b\_ref}$, and $V_{c\_ref}$ may be generated by a motor control algorithm (e.g., field oriented control) that receives one or more feedback signals used to control the generation of the AC outputs, including but not limited to: monitored AC output voltage, monitored AC output current, monitored AC output frequency, monitored DC link voltage, monitored DC link current, or a combination thereof. The commanded reference voltages $V_{a\_ref}$, $V_{b\_ref}$, and $V_{c\_ref}$ are processed by reference signal processor 42 to generate processed AC signals EA, EB and EC. As part of this process, signal processor 42 adjusts the phase angle and magnitude associated with the commanded reference voltages $V_{a\_ref}$, $V_{b\_ref}$, and $V_{c\_ref}$ such that the resulting processed signals Ea, Eb, and Ec can be used to impose the constraints described by equations (1)-(4). In addition to the phase angle and magnitude adjustments, reference signal processor 42 adds triplen injection to the output signals Ea, Eb, and Ec in order to fully utilize the DC link voltage.

Processed signals Ea, Eb, and Ec are converted to square wave signals by comparator circuit 44. Each processed signal Ea, Eb, and Ec is compared to a triangle wave generated by triangle carrier generator 48. For instance, processor signal Ea is compared to the triangle wave by comparator comp1, processor signal Eb is compared to the triangle wave by comparator comp2, and so on. A binary output (i.e., either '1' or '0') is generated by each comparator, reflecting whether each processed signal was higher or lower than the triangle wave to which it was compared. The resulting square waves Sa, Sb, and Sc, known as pulse width modulated (PWM) waveforms, are provided to gating signal distributor 46.

Gating signal distributor 46 generates the controls signals (labeled corresponding to the transistor to which they are provided) that are provided to corresponding switching elements located within power inverter 36. In particular, gating signal distributor 46 reduces or eliminates the common mode voltage by enforcing the constraint defined by equations (1)-(4) on the control signals. The control signals may be described generally as PWM waveforms, but for purposes of this description they are referred to generally as control signals.

FIG. 5 is a logic diagram illustrating operations performed by the reference signal processor 42 according to an aspect of the present invention. In this embodiment, reference signal processor 42 includes difference devices 48a, 48b, and 48c, gain devices 50a, 50b, and 50c, diodes D13-D18, resistors R1, R2, and R3, and summer devices 52a, 52b, and 52c.

The reference signals $V_{a\_ref}$, $V_{b\_ref}$, and $V_{c\_ref}$ are provided as inputs to reference signal processor 42. Difference devices 48a, 48b, and 48c compare the voltages of the reference signals to generate line-to-line voltages. For instance, reference signal $V_{a\_ref}$ is compared by difference device 48a with reference signal $V_{b\_ref}$, the difference between the signals as calculated by difference device 48a defines the line-to-line voltage between reference signal $V_{a\_ref}$ and reference signal $V_{b\_ref}$. Likewise, reference signal $V_{b\_ref}$ is compared with reference signal $V_{c\_ref}$, the difference between the signals as calculated by difference device 48b defines the line-to-line voltage between reference signal $V_{b\_ref}$ and reference signal $V_{c\_ref}$. The resulting line-to-line voltages are labeled $V_{ab}$, $V_{bc}$, and $V_{ca}$, respectively.

The resulting line-to-line voltages $V_{ab}$, $V_{bc}$, and $V_{ca}$ are provided to gain devices 50a, 50b, and 50c, respectively, which multiplies the line-to-line voltages by a value of ⅔. In this example, multiplying the line-to-line voltages by a value of ⅔ accounts for the use of line-to-line voltages as opposed to line-to-neutral voltages.

The resulting modified signals are provided to diodes D13-D18, which act to select the minimum and maximum value associated with the resulting modified signals. In particular, diodes D13, D14, and D15 select the maximum voltage from the resulting modified signals and diodes D16, D17, and D18 select the minimum voltage from the resulting modified signals. The maximum and minimum values are provided through the resistor network including resistors R1, R2, and R3 to operational amplifier ("OpAmp") 53. In this embodiment, resistors R1 and R2 have the same resistance value, while resistor R3 has a resistance value that is one-half that of resistor R1. As a result, the output generated by OpAmp 53 is one-half of the average value associated with the average maximum and minimum values associated with maximum and minimum values. The resulting half average value is added to each of the modified signals to generate processed signals Ea, Eb, and Ec.

In this way, the processed reference signals Ea, Eb, and Ec are modified versions of the input reference signals. In particular, the modification results in triplen injections that can utilize the DC link voltage to generate maximum AC output voltage in power inverter 36. The processing performed by reference signal processor 42 also modifies the phase and magnitude of the reference signals such that subsequent processing is able to impose the constraints defined by equations (1)-(4) for power inverter 36, and equations (5)-(8) for active rectifier 34.

FIG. 6 is a logic diagram illustrating operations performed by gating signal distributor 46 according to an exemplary embodiment of the present invention. This embodiment, for the sake of simplicity, is one again directed towards generating PWM signals to be provided to power inverter 36. The principles described with respect to FIG. 6 would be applicable to the process for generating PWM signals for active rectifier 34.

Logic included within gating signal distributor 46 includes XOR gates 54a, 54b, and 54c, AND gates 56a, 56b, 56c, AND gates 58a, 58b, and 58c, and NOT gates 60a, 60b, and 60c. Processed PWM signals Sa, Sb, and Sc are provided as an input to gating signal distributor 46 from comparator circuit 44 (shown in FIG. 4). The logical gates to which the signals are applied are configured to enforce the constraint described with respect to equation (4). The resulting control signals generated by gating signal distributor 46 will enforce the constraint defined by equation (4), thereby minimizing common-mode voltage generated by power inverter 36 while regulating the AC output voltage $V_{a\_out}$, $V_{b\_out}$, and $V_{c\_out}$ to desired values.

The following truth-table (Table 1) illustrates for each set of inputs the resulting output generated by the logic of gating signal distributor 46.

TABLE 1

| INPUTS | | | PHASE A | | | PHASE B | | | PHASE C | | |
|---|---|---|---|---|---|---|---|---|---|---|---|
| SA | SB | SC | SR1 | SR2 | SRx1 | SR3 | SR4 | SRx2 | SR5 | SR6 | SRx3 |
| 0 | 0 | 0 | 0 | 0 | 1 | 0 | 0 | 1 | 0 | 0 | 1 |
| 0 | 0 | 1 | 0 | 1 | 0 | 0 | 1 | 0 | 1 | 0 | 0 |
| 0 | 1 | 0 | 0 | 0 | 1 | 1 | 0 | 0 | 0 | 1 | 0 |
| 0 | 1 | 1 | 0 | 1 | 0 | 1 | 0 | 0 | 0 | 0 | 1 |
| 1 | 0 | 0 | 1 | 0 | 0 | 0 | 1 | 0 | 0 | 0 | 1 |
| 1 | 0 | 1 | 0 | 0 | 1 | 0 | 1 | 0 | 1 | 0 | 0 |
| 1 | 1 | 0 | 1 | 0 | 0 | 0 | 0 | 1 | 0 | 1 | 0 |
| 1 | 1 | 1 | 0 | 0 | 1 | 0 | 0 | 1 | 0 | 0 | 1 |

As the truth table illustrates, for each combination of inputs (excluding the input $S_a=0$, $S_b=0$ and $S_c=0$, in which each AC output is connected to the neutral DC bus) the resulting sum of the integer values associated with the DC inputs to which the AC outputs are connected is equal to zero. For example, in the second row of the truth table (e.g., $S_a=0$, $S_b=0$, and $S_c=1$), AC output $V_{a\_out}$ is connected through transistor S2 to the negative DC bus, AC output $V_{b\_out}$ is connected through auxiliary switch Sx2 to the neutral DC bus, and AC output $V_{c\_out}$ is connected through switch S5 to the positive DC bus. The constraint defined by equation (4) is thereby satisfied (i.e., $V_{a\_out}(-1)+V_{b\_out}(0)+V_{c\_out}(1)$ is equal to zero). The logic defined by gating signal distributor 46 maintains the constraint imposed by equation (4) for each set of possible inputs. In this way, converter 38 derives control signals required to maintain the outputs of active rectifier 34 and power inverter 36 at desired values, while reducing or eliminating the common-mode voltage generated as a result of each.

The present invention therefore provides a system and method for reducing common-mode voltages in active devices such as active rectifiers and power inverters. The methods may be used in conjunction with individual devices (e.g., a standalone rectifier) or as part of a power conversion system such as the one described with respect to FIGS. 2 and 3. In addition, the principles described above may be applied to a variety of active rectifier and power inverter topologies, including those with additional level of inputs and outputs (e.g., a rectifier generating an odd-number of DC outputs).

Although the present invention has been described with reference to preferred embodiments, workers skilled in the art will recognize that changes may be made in form and detail without departing from the spirit and scope of the invention.

The invention claimed is:

1. A controller for reducing common mode voltage in a power conversion system having a plurality of inputs and a plurality of outputs, the controller comprising:
a plurality of control signals connected to switching devices within the power conversion system, wherein the switching devices are responsive to the control signals to selectively connect each output of the power conversion system to one of the plurality of inputs of the power conversion system;
a reference signal generator that generates reference signals representing a desired value for each of the plurality of outputs of the power conversion system;
a comparator circuit for converting the reference signals to square wave representations of the reference signals; and
a gating signal distributor having a plurality of logic circuits configured to generate the control signals to be supplied to the switching devices based on the square wave representations of the reference signals, and configured to impose a constraint on the control signals that is defined by assigning an integer value to each input of the power conversion system and requiring that selective connection of the outputs of the power conversion system to the inputs results in a sum of the integer values being equal to zero at any given time.

2. The controller of claim 1, wherein the power conversion system comprises a power inverter for converting an odd number of DC inputs to a plurality of AC outputs.

3. The controller of claim 2, wherein connection of each AC output to one of the DC inputs is defined by an integer value depending on the DC input, wherein the constraint imposed by the controller requires that the sum of the integer values defining the connection of each AC output to the DC inputs is equal to zero.

4. The controller claim 2, wherein the power conversion system includes a plurality of switches S1, S2 and Sx1 for selectively connecting a first AC output to a positive DC input, a negative DC input, and a neutral DC input, respectively, a plurality of switches S3, S4, and Sx2 for selectively connecting a second AC output to the positive DC input, the negative DC input, and the neutral DC input, respectively, and a plurality of switches S5, S6, and Sx3 for selectively connecting a third AC output to the positive DC input, the negative DC input, and the neutral DC input, respectively.

5. The controller of claim 1, wherein the power conversion system comprises an active rectifier for converting a plurality of AC inputs to a plurality of odd-numbered DC outputs.

6. The controller of claim 5, wherein connection of each DC output to one of the AC inputs is defined by an integer value depending on the DC output to which the AC input is connected, wherein the constraint imposed by the controller requires that the sum of the integer values defining the connection of each DC output to the AC inputs is equal to zero.

7. The controller claim 5, wherein the power conversion system includes a plurality of switches SR1, SR2 and SRx1 for selectively connecting a first AC input to a positive DC output, a negative DC output, and a neutral DC output, respectively, a plurality of switches SR3, SR4, and SRx2 for selectively connecting a second AC input to the positive DC output, the negative DC output, and the neutral DC output, respectively, and a plurality of switches SR5, SR6, and SRx3 for selectively connecting a third AC input to the positive DC output, the negative DC output, and the neutral DC output, respectively.

8. An AC-DC-AC power conversion system for reducing common mode voltage, the power conversion system comprising:
an active rectifier having an odd number of DC outputs selectively connectable through a first plurality of switching devices to a plurality of AC inputs, wherein the switching devices are responsive to first control signals to selectively connect each of the DC outputs to one of the plurality of AC inputs;
a power inverter having a plurality of AC outputs selectively connectable through a second plurality of switching devices to each of the DC outputs, wherein the switching devices are responsive to second control signals to selectively connect each of the AC outputs to one of the DC outputs; and
a controller for generating the first and second control signals provided to the active rectifier and the power inverter, respectively, wherein with respect to the active rectifier the controller imposes a first constraint defined by assigning an integer value to each DC output and maintaining with respect to each DC output connected to an AC input that a sum of the integer values corresponding with the DC output connected to the AC inputs equals zero, and with respect to the power inverter the controller imposes a second constraint defined by assigning an integer value to each DC output and maintaining with respect to each AC output connected to the DC outputs that a sum of the integer values corresponding with the DC output connected to the AC outputs equals zero.

9. The power conversion system of claim 8, wherein the active rectifier receives three-phase AC input and generates in response a positive DC output, a negative DC output and a neutral DC output, wherein the controller assigns an integer value of '1' to the positive DC output, an integer value of '0' to the neutral DC output, and an integer value of '−1' to the negative DC output and applies the constraint such that connection of the DC outputs to the AC inputs results in the assigned integer values summing to zero.

10. The power conversion system of claim 8, wherein the power inverter receives as input a positive DC output, a negative DC output and a neutral DC output, wherein the controller assigns an integer value of '1' to the positive DC output, an integer value of '0' to the neutral DC output, and an integer value of '−1' to the negative DC output and applies the constraint such that connection of the AC inputs to the DC outputs results in the assigned integer values summing to zero.

11. The power conversion system of claim 8, wherein the constraint is implemented in the controller as analog circuitry.

12. The power conversion system of claim 8, wherein the constraint is implemented in the controller as part of an integrated circuit (IC).

13. An AC-DC power conversion system comprising:
an active rectifier having an odd number of DC outputs selectively connectable through a plurality of switching devices to a plurality of AC inputs, wherein the switching devices are responsive to control signals to selectively connect each of the DC outputs to a selected AC input; and
a controller for generating the control signals provided to the active rectifier to selectively connect at any given moment each of the DC outputs with one of the plurality of AC inputs, wherein the controller imposes a constraint defined by assigning an integer value to each DC output and maintaining with respect to each DC output connected to an AC input a requirement that the sum of the integer values corresponding with the DC outputs connected to the AC inputs equals zero.

14. The AC-DC power conversion system of the claim 13, wherein the active rectifier includes switches SR1, SR2 and SRx1 for selectively connecting a first AC input to a positive DC output, a negative DC output, and a neutral DC output, respectively, switches SR3, SR4, and SRx2 for selectively connecting a second AC input to the positive DC output, the negative DC output, and the neutral DC output, respectively, and switches SR5, SR6, and SRx3 for selectively connecting a third AC input to the positive DC output, the negative DC output, and the neutral DC output, respectively.

15. An DC-AC power conversion system comprising:
a power inverter having a plurality of AC outputs selectively connectable through a plurality of switching devices to an odd-number of DC inputs, wherein the switching devices are responsive to control signals to selectively connect each of the AC outputs to a selected DC input; and
a controller for generating the control signals provided to the power inverter to selectively connect at any given moment each of the AC outputs with one of the DC inputs, wherein the controller imposes a constraint defined by assigning an integer value to each DC input and maintaining with respect to each AC output connected to a DC input a requirement that the sum of integers corresponding with the DC inputs equals zero.

16. The DC-AC power conversion system of claim 15, wherein the power inverter includes switches S1, S2 and Sx1 for selectively connecting a first AC output to a positive DC input, a negative DC input, and a neutral DC input, respectively, a plurality of switches S3, S4, and Sx2 for selectively connecting a second AC output to the positive DC input, the negative DC input, and the neutral DC input, respectively, and a plurality of switches S5, S6, and Sx3 for selectively connecting a third AC output to the positive DC input, the negative DC input, and the neutral DC input, respectively.

* * * * *